(12) United States Patent
Na et al.

(10) Patent No.: US 11,199,975 B2
(45) Date of Patent: Dec. 14, 2021

(54) INTERFACE CIRCUIT FOR PROCESSING COMMANDS, MEMORY DEVICE INCLUDING THE SAME, STORAGE DEVICE, AND METHOD OF OPERATING THE MEMORY DEVICE

(71) Applicant: Samsung Electronics Co., Ltd., Suwon-si (KR)

(72) Inventors: Daehoon Na, Seoul (KR); Jangwoo Lee, Seoul (KR); Jeongdon Ihm, Seongnam-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 16/861,802

(22) Filed: Apr. 29, 2020

(65) Prior Publication Data

US 2021/0072902 A1 Mar. 11, 2021

(30) Foreign Application Priority Data

Sep. 11, 2019 (KR) .......................... 10-2019-0113012

(51) Int. Cl.
  *G06F 13/00* (2006.01)
  *G06F 3/06* (2006.01)

(52) U.S. Cl.
  CPC .......... *G06F 3/0613* (2013.01); *G06F 3/0659* (2013.01); *G06F 3/0679* (2013.01)

(58) Field of Classification Search
  CPC .... G06F 3/0613; G06F 3/0659; G06F 3/0679; G06F 13/1647; G06F 3/0688; G06F 13/1673; G06F 13/1684; G06F 13/1615; G06F 13/1642; G06F 3/061; G11C 7/1006; G11C 8/06; G11C 8/12

See application file for complete search history.

(56) References Cited

U.S. PATENT DOCUMENTS

| 4,716,545 A | * | 12/1987 | Whipple ................. G06F 12/04 711/200 |
| 5,136,582 A | * | 8/1992 | Firoozmand .......... H04L 47/521 370/400 |
| 6,778,436 B2 | | 8/2004 | Piau et al. |

(Continued)

OTHER PUBLICATIONS

Extended European Search Report dated Dec. 2, 2020 issued in corresponding European Patent Application No. 20186037.6-1224.

*Primary Examiner* — Jing-Yih Shyu
(74) *Attorney, Agent, or Firm* — Harness, Dickey & Pierce, P.L.C.

(57) ABSTRACT

An interface circuit of a memory device including a plurality of memory dies including a plurality of registers corresponding to the plurality of memory dies, respectively, the plurality of registers each configured to store command information related to a data operation command, a demultiplexer circuit configured to provide input command information to a selected register from among the plurality of registers according to at least one of a first address or a first chip selection signal, the input command information being received from outside the interface circuit, and a multiplexer circuit configured to receive output command information from the selected register from among the plurality of registers and output the output command information according to at least one of a second address or a second chip selection signal may be provided.

19 Claims, 12 Drawing Sheets

(56) References Cited

U.S. PATENT DOCUMENTS

| | | | |
|---|---|---|---|
| 8,159,886 B2 | 4/2012 | Miyamoto et al. | |
| 8,996,759 B2 | 3/2015 | Chung | |
| 9,159,438 B2 | 10/2015 | Im | |
| 9,335,952 B2 | 5/2016 | Buxton et al. | |
| 9,921,763 B1 | 3/2018 | Zitlaw | |
| 9,933,950 B2 * | 4/2018 | Hyun | G06F 3/0659 |
| 2004/0210729 A1 | 10/2004 | Horii et al. | |
| 2012/0203986 A1 * | 8/2012 | Strasser | G06F 3/0688 |
| | | | 711/158 |
| 2013/0024460 A1 * | 1/2013 | Peterson | G06F 3/0679 |
| | | | 707/741 |
| 2017/0228167 A1 * | 8/2017 | Manohar | G06F 3/0688 |

* cited by examiner

INTERFACE CIRCUIT FOR PROCESSING COMMANDS, MEMORY DEVICE INCLUDING THE SAME, STORAGE DEVICE, AND METHOD OF OPERATING THE MEMORY DEVICE

CROSS-REFERENCE TO RELATED APPLICATION

This application claims priority under 35 U.S.C. § 119 to Korean Patent Application No. 10-2019-0113012, filed on Sep. 11, 2019, in the Korean Intellectual Property Office, the disclosure of which is incorporated herein in its entirety by reference.

BACKGROUND

The inventive concepts relate to interface circuits, memory devices, storage devices, and/or methods of operating the memory device, and more particularly, to interface circuits for processing a command, memory devices including the same, storage devices, and/or methods of operating the memory device.

Semiconductor memory devices may be classified into volatile memory devices, which lose data stored therein when power supply is interrupted, and non-volatile memory devices, which do not lose data stored therein when power supply is interrupted. Volatile memory devices have fast read and write speed, but data stored in volatile memory devices disappears when external power supply is interrupted. In contrast, non-volatile memory devices have slower read and write speed than volatile memory devices, but retain data stored therein even when external power supply is interrupted.

Non-volatile memory devices such as flash memory are widely used in various fields due to their advantages such as high capacity, low noise, and low power. For example, a solid state disk or drive (SSD) based on flash memory is used as a mass storage device in a personal computer, a notebook, a work station, a server, or the like. SSD devices are usually connected to a computing system based on a serial advanced technology attachment (SATA) interface or a peripheral component interconnect (PCI)-express interface. However, with the recent increase in data processed by a computing system, a greater amount of data to be processed compared to the data bandwidth or communication speed of an interface connected to SSD devices tends to cause a bottleneck phenomenon for data processing. Such phenomenon causes performance degradation in computing systems. Therefore, various techniques for increasing performance are being developed to solve this problem.

SUMMARY

The inventive concepts provide interface circuits, memory devices, storage devices, methods of operating the memory device, and/or methods and devices for reducing data communication time and increasing the operating speed of the memory device and the storage device.

According to an example embodiment of the inventive concepts, an interface circuit of a memory device including a plurality of memory dies includes a plurality of registers corresponding to the plurality of memory dies, respectively, the plurality of registers each configured to store command information related to a data operation command, a demultiplexer circuit configured to provide input command information to a selected register from among the plurality of registers according to at least one of a first address or a first chip selection signal, the input command information being received from outside the interface circuit, and a multiplexer circuit configured to receive output command information from the selected register from among the plurality of registers and output the output command information according to at least one of a second address or a second chip selection signal.

According to an example embodiment of the inventive concepts, a method of operating a memory device including a first memory die and a second memory die includes performing a first data operation on the first memory die in response to input of a first command, storing first command information related to the first command in a first register corresponding to the first memory die, stopping the first data operation, performing a second data operation on the second memory die in response to a second input of a second command, and performing a remaining data operation on the first memory die based on the first command information stored in the first register, without receiving an additional resume command, the remaining data operation having not been performed during the first data operation.

According to an example embodiment of the inventive concepts, a memory device includes a plurality of memory dies including a first memory die and a second memory die, an interface circuit configured to store a plural pieces of command information, the plural pieces of command information corresponding to the plurality of memory dies, respectively, the interface circuit configured to selectively output at least one of the plural pieces of command information, and a control logic configured to perform a first data operation according to a first selection signal and a first command, stop the first data operation on the first memory die in response to an input of a second selection signal and a second command for the second memory die during performing the first data operation, control the memory device to perform a second data operation corresponding to the second command on the second memory die, and control the memory device to perform a remaining data operation of the first data operation on the first memory die based on first piece of the plural pieces of command information in response to a re-input of the first selection signal, the first piece of the plural pieces of command information related to the first command received from the interface circuit.

According to an example embodiment of the inventive concepts, a storage device includes a memory device including a first memory die, a second memory die, and an interface circuit, and a memory controller configured to provide a first data operation command for the first memory die and a second data operation command for the second memory die, wherein the interface circuit may store at least one of the first data operation command or a first data operation control signal in response to the first data operation command, the first data operation control signal being generated based on the first data operation command, and the memory device may be configured to perform a first data operation on the first memory die based on the at least one of the first data operation command or the first data operation control signal in response to completion of a second data operation on the second memory die according to the second data operation command, the first data operation command and the first data operation control signal having been stored in the interface circuit.

According to an example embodiment of the inventive concepts, a memory device includes a first memory die, a second memory die, and an interface circuit including a plurality of registers including a first register and a second register, the first register corresponding to the first memory die and the second register corresponding to the second memory die, wherein the interface circuit may be configured to select one register, which corresponds to one of the first memory die or the second memory die, from among the plurality of registers based on at least one of an address or a chip selection signal and store a command input from outside the memory device in the selected one register.

BRIEF DESCRIPTION OF THE DRAWINGS

Example embodiments of the inventive concept will be more clearly understood from the following detailed description taken in conjunction with the accompanying drawings in which.

DETAILED DESCRIPTION

Hereinafter, some example embodiments will be described in detail with reference to the accompanying drawings.

Figure 1:
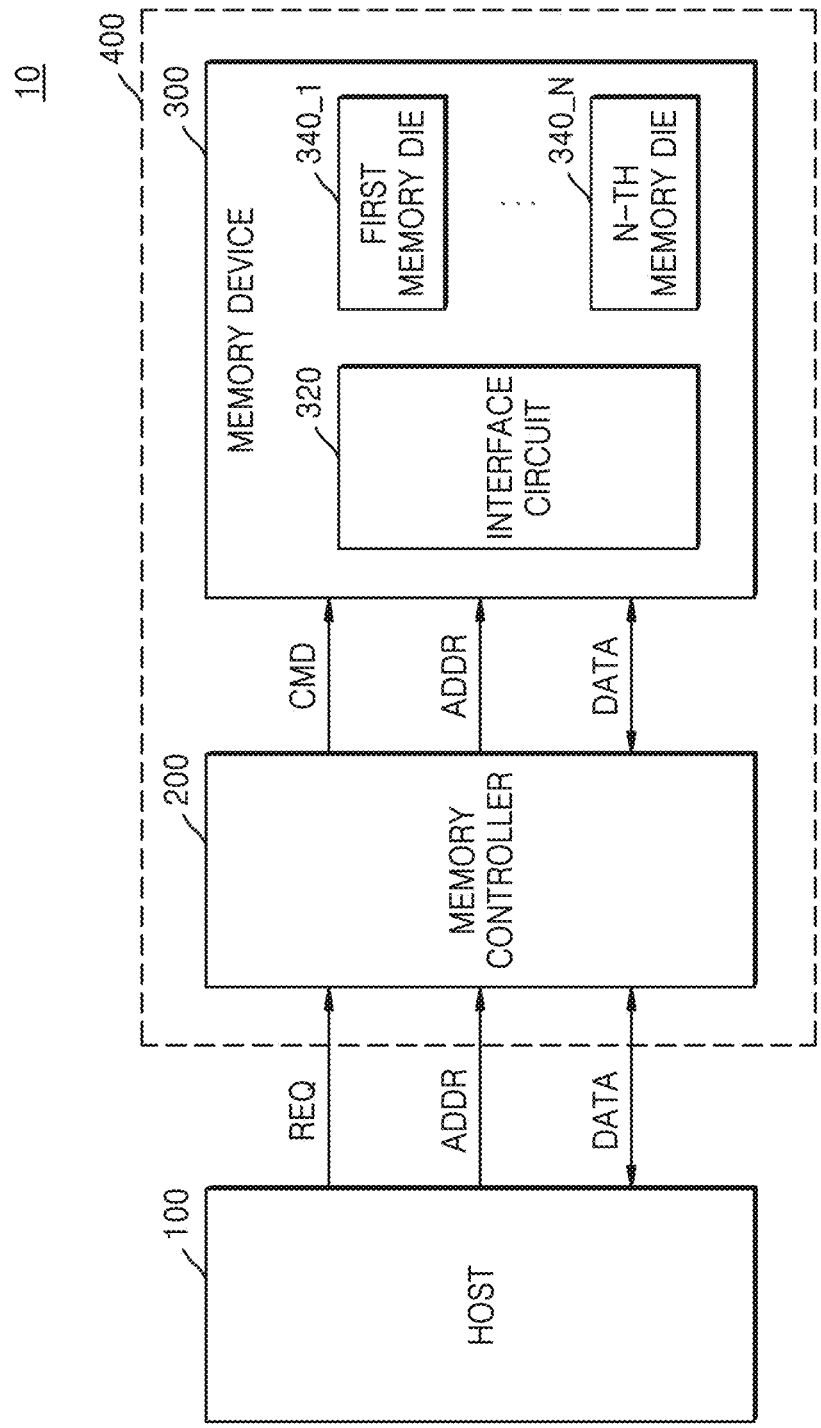
FIG. 1 illustrates a data processing system according to an example embodiment.

FIG. 1 illustrates a data processing system 10 according to an example embodiment. The data processing system 10 may include a host 100 and a memory system 400. The memory system 400 may include a memory controller 200 and a memory device 300. The data processing system 10 may be applied to any one of various computing systems such as an ultra mobile personal computer (UMPC), a work station, a netbook, a personal digital assistant (PDA), a portable computer, a web tablet, a wireless phone, a mobile phone, a smart phone, an e-book, a portable multimedia player (PMP), a portable game machine, a navigation device, a black box, and a digital camera.

Each of the host 100, the memory controller 200, and the memory device 300 may be provided as a single chip, a single package, a single module, or the like. However, example embodiments are not limited thereto. For example, the memory controller 200 and the memory device 300 may be provided together as the memory system 400 or a storage device in a single chip, a single package, a single module, or the like.

The memory system 400 may form a PC card (previously known as a Personal Computer Memory Card International Association (PCMCIA) card), a compact flash (CF) card, a smart media (SM) card (SMC), a memory stick, a multimedia card (MMC), a reduced-size MMC (RS-MMC), an MMCmicro card, a secure digital (SD) card, a miniSD card, a microSD card, or universal flash storage (UFS). In some example embodiments, the memory system 400 may form a solid state disk or drive (SSD).

The host 100 may transmit a data operation request REQ and an address ADDR to the memory controller 200 and may exchange data DATA with the memory controller 200. For example, the host 100 may exchange the data DATA with the memory controller 200 based on at least one selected from various interface protocols (e.g., a universal serial bus (USB) protocol, an MMC protocol, a peripheral component interconnect (PCI) protocol, a PCI-express (PCI-E) protocol, an advanced technology attachment (ATA) protocol, a serial-ATA protocol, a parallel-ATA protocol, a small computer small interface (SCSI) protocol, an enhanced small disk interface (ESDI) protocol, an integrated drive electronics (IDE) protocol, a mobile industry processor interface (MIPI) protocol, or a UFS protocol).

The memory controller 200 may control the memory device 300. For example, the memory controller 200 may control the memory device 300 to read the data DATA stored therein or write the data DATA thereto in response to the data operation request REQ. For example, the memory controller 200 may control the write, read, and erase operations of the memory device 300 by providing the address ADDR, a command CMD, and a control signal (not specifically indicated din FIG. 1) to the memory device 300. The data DATA may be exchanged between the memory controller 200 and the memory device 300 for the operations. In an example embodiment, the memory controller 200 may provide a read enable signal to the memory device 300.

The memory device 300 may include at least one memory die. For example, the memory device 300 may include a plurality of memory dies. For example, the memory device 300 may include first through N-th memory dies 340_1 through 340_N, where N is a natural number of at least 2. A memory die may be referred to as a memory way. Each of the first through N-th memory dies 340_1 through 340_N may include at least one memory cell array. The memory cell array may include a plurality of memory cells at intersections between a plurality of word lines and a plurality of bit lines. The memory cells may include non-volatile memory cells. Each of the memory cells may be a multi-level cell (MLC) that stores at least two bits of data. For example, each memory cell may be a 2-bit MLC that stores two bits of data, a triple-level cell (TLC) that stores three bits of data, a quadruple-level cell (QLC) that stores four bits of data, or an MLC that stores at least five bits of data. However, example embodiments are not limited thereto. For example, some memory cells may be single-level cells (SLCs) that store one bit of data per cell, and other memory cells may be MLCs. The memory device 300 may include NAND flash memory, vertical NAND (VNAND) flash memory, NOR flash memory, resistive random access memory (RRAM), phase-change RAM (PRAM), magnetoresistive RAM (MRAM), ferroelectric RAM (FRAM), spin transfer torque RAM (STT-RAM), or a combination thereof. In an example embodiment, the memory device 300 may have a stack structure including at least 100 layers. In an example embodiment, the memory device 300 may have a cell-on-peri or cell-over-peri (COP) structure. The memory device 300 may perform operations (e.g., a write operation, a read operation, and an erase operation) with respect to the data DATA in response to signals from the memory controller 200. In an example embodiment, the memory device 300 may generate a data strobe signal based on a read enable signal from the memory controller 200, and provide the memory controller 200 with the data strobe signal generated based on a read enable signal.

In an example embodiment, an operating frequency of the memory device 300 may be at least 1 GHz.

The memory device 300 may include an interface circuit 320. The interface circuit 320 may buffer at least one signal input from outside the memory device 300. For example, the interface circuit 320 may store the command CMD from the memory controller 200 and/or a data operation control signal generated based on the command CMD. The interface circuit 320 may be alternatively referred to as a buffer chip or a buffer circuit. Here, the buffer chip may be configured to buffer signals input from outside the memory device 300.

In an example embodiment, the interface circuit 320 may include a plurality of registers. The registers may store plural pieces of command information for respective ones of a plurality of memory dies. Here, the plural pieces of command information refer to information about the command CMD provided from the memory controller 200 and may include the command CMD and/or a data operation control signal, which is generated in the memory device 300 based on the command CMD. The data operation control signal may include control signals that are desired for data operations (e.g., a write operation, a read operation, and an erase operation) of the memory device 300. For example, the data operation control signal may include at least one selected from various control signals including, for example, a voltage control signal, a row decoder control signal, a column decoder control signal, and a data input/output control signal.

For example, the interface circuit 320 may include first through N-th registers (not specifically illustrated in FIG. 1). The first register may store one of the plural pieces of command information corresponding to the first memory die 340_1 and the N-th register may store one of the plural pieces of command information corresponding to the N-th memory die 340_N.

In an example embodiment, when the command CMD for a particular memory die is input from the memory controller 200, the interface circuit 320 may select a register corresponding to the particular memory die among the plurality of registers and store a corresponding one of the plural pieces of command information regarding the command CMD in the selected register. For this operation, in an example embodiment, the interface circuit 320 may include a demultiplexer circuit (322 in FIG. 4) that selects a register, in which a corresponding one of the plural pieces of command information is to be stored, from a plurality of registers.

In an example embodiment, the memory device 300 may perform memory interleaving. For example, when a plurality of memory dies in the memory device 300 further includes the second memory die (340_2 in FIG. 2), the memory device 300 that is performing a first data operation on the first memory die 340_1 may stop the first data operation and perform a second data operation on the second memory die in response to a data operation command for the second memory die. In response to completion of the second data operation, the memory device 300 may perform the remaining data operation of the first data operation, which has not been performed yet, on the first memory die 340_1 in response to the address ADDR and/or a chip selection signal, each indicating selection of the first memory die 340_1.

In a comparative example, an interface circuit of a memory device stores only a command that has been most recently input from a memory controller during the memory interleaving described above. Accordingly, to perform the remaining data operation of the first data operation after the second data operation is completed, the memory device needs to additionally receive a command (e.g., a data operation command or a resume command) regarding the first data operation from the memory controller. Because it takes time to additionally receive the command, the data operation time of the memory device increases in the comparative example.

According to an example embodiment, however, in the interface circuit 320 of the memory device 300, each of a plurality of registers, which correspond to a respective one of a plurality of memory dies, stores a corresponding one of the plural pieces of command information for a corresponding memory die, and therefore the memory device 300 may perform the remaining data operation of the first data operation based on the corresponding one of the plural pieces of command information, which is stored in the interface circuit 320 in regard to the first data operation, without additionally receiving a command. In this case, the interface circuit 320 may select a register corresponding to a desired memory die among the registers based on the address ADDR and/or a chip selection signal, receive a corresponding one of the plural pieces of command information regarding the command CMD from the selected register, and output the corresponding one of the plural pieces of command information. For these operations, in an example embodiment, the interface circuit 320 may include a multiplexer circuit (326 in FIG. 4) that selects a register, which provides a corresponding one of the plural pieces of command information, among a plurality of registers.

In other words, in the data processing system 10 according to the present example embodiment, the interface circuit 320 stores a corresponding one of the plural pieces of command information in each of a plurality of registers, which correspond to respective ones of a plurality of memory dies, and accordingly the memory device 300 may resume a data operation that has been stopped, without receiving an additional command, during memory interleaving or the like. Therefore, the time taken for an input of an additional command and/or command decoding may be saved, and the time taken for data communication of the memory device 300 and the memory system 400 may be reduced. Furthermore, as the time taken for data communication is reduced, the operating speed of the memory device 300 and the memory system 400 may be increased.

Figure 2:
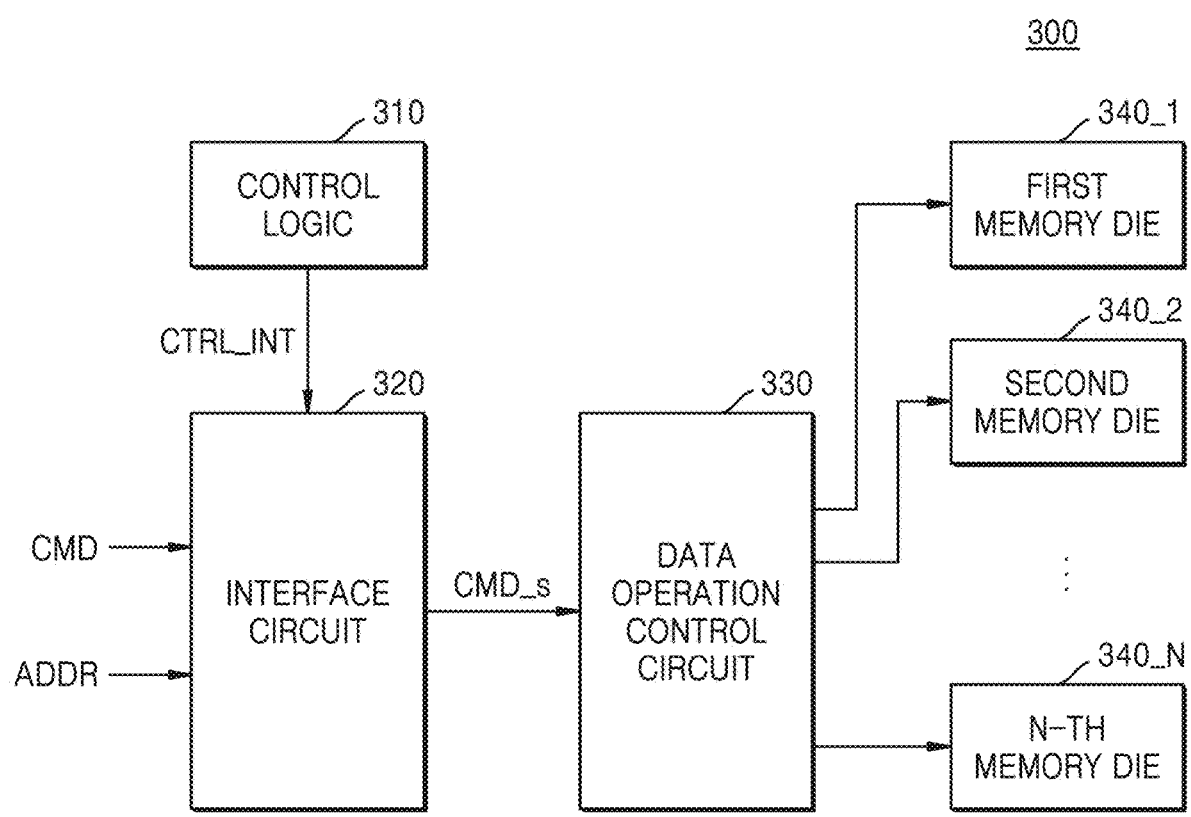
FIG. 2 illustrates a memory device according to an example embodiment.

FIG. 2 illustrates the memory device 300 according to an example embodiment. The memory device 300 of FIG. 2 may be configured to correspond to the memory device 300 in FIG. 1. Redundant descriptions given with reference to FIG. 1 will be omitted.

The memory device 300 may include a control logic 310, the interface circuit 320, a data operation control circuit 330, and a plurality of memory dies. The memory dies may include the first memory die 340_1 and the second through N-th memory dies 340_2 through 340_N.

The control logic 310 may control various functions of the memory device 300. For example, the control logic 310 may generate various internal control signals for writing data to or reading data from a memory cell array, which is included in the memory dies, based on the command CMD, the address ADDR, and a control signal, which are received from the memory controller 200 in FIG. 1. In an example embodiment, the control logic 310 may control the interface circuit 320. To control the interface circuit 320, the control logic 310 may provide an interface circuit control signal CTRL INT to the interface circuit 320. The control logic 310 may include processing circuitry such as hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

The interface circuit 320 may store plural pieces of command information regarding the command CMD input from outside the memory device 300. For example, the interface circuit 320 may include a plurality of registers, each of which correspond to a respective one of the memory dies, and each of the registers may store a corresponding one of the plural pieces of command information for a corresponding memory die. According to some example embodiments, each of the plural pieces of the command information may be the command CMD itself, may include a data operation control signal generated based on the command CMD, or may include both the command CMD and the data operation control signal. An operation of each register of the interface circuit 320 that is configured to store the command CMD for a corresponding memory die will be described below with reference to FIG. 2.

In an example embodiment, when a first command for a first memory die is received from a memory controller, the interface circuit 320 may select a first register corresponding to the first memory die among the registers based on the address ADDR and/or a chip selection signal and may store the first command in the first register.

In an example embodiment, the interface circuit 320 may select one of the registers and thus be provided with a command from the selected register. Here, the command is referred to as a selected command CMD_s. The interface circuit 320 may provide the selected command CMD_s to the data operation control circuit 330.

For example, the memory device 300 may perform memory interleaving. When the memory device 300 receives the second command for the second memory die 340_2 while performing the first data operation in response to the first command for the first memory die 340_1, the memory device 300 may stop the first data operation and perform the second data operation on the second memory die 340_2 in response to an input of the second command. After the second data operation on the second memory die 340_2 is completed, the interface circuit 320 may output the first command, which is stored in the first register for the first memory die 340_1, as the selected command CMD_s.

The data operation control circuit 330 may control a data operation on at least one memory die based on the command CMD and/or the selected command CMD_s. For example, the data operation control circuit 330 may generate at least one data operation control signal related to a data operation. The data operation control circuit 330 may be implemented in various forms. According to an example embodiment, the data operation control circuit 330 may be implemented by hardware or a combination of hardware and software. When the data operation control circuit 330 is implemented by hardware, the data operation control circuit 330 may include circuits for generating a data operation control signal based on the command CMD and/or the selected command CMD_s. When the data operation control circuit 330 is implemented by the combination of hardware and software, a data operation control signal may be generated by executing a program and/or instructions, each loaded to a memory in the memory device 300, using the control logic 310 or a processor in the memory device 300. For example, the data operation control circuit 330 may be firmware. However, example embodiments are not limited thereto.

In an example embodiment, as described above, the memory device 300 may resume the first data operation that has been stopped to perform the second data operation during the memory interleaving. For this operation, the interface circuit 320 may provide the first command, which is stored in the first register corresponding to the first memory die 340_1, to the data operation control circuit 330 as the selected command CMD_s. The data operation control circuit 330 may generate data operation control signals related to the first data operation on the first memory die 340_1 based on the selected command CMD_s. The data operation control circuit 330 may perform the remaining data operation of the first data operation on the first memory die 340_1 using the data operation control signals.

In the memory device 300 according to the present example embodiment, the interface circuit 320 stores plural pieces of command information in each of a plurality of registers, correspond to a plurality of memory dies, respectively, and thus the memory device 300 may resume a data operation that has been stopped, without receiving an additional command, during memory interleaving or the like. Therefore, the time taken for an input of an additional command and/or command decoding may be saved, and the time taken for data communication of the memory device 300 may be reduced. Furthermore, as the time taken for data communication is reduced, the operating speed of the memory device 300 may be increased.

Figure 3:
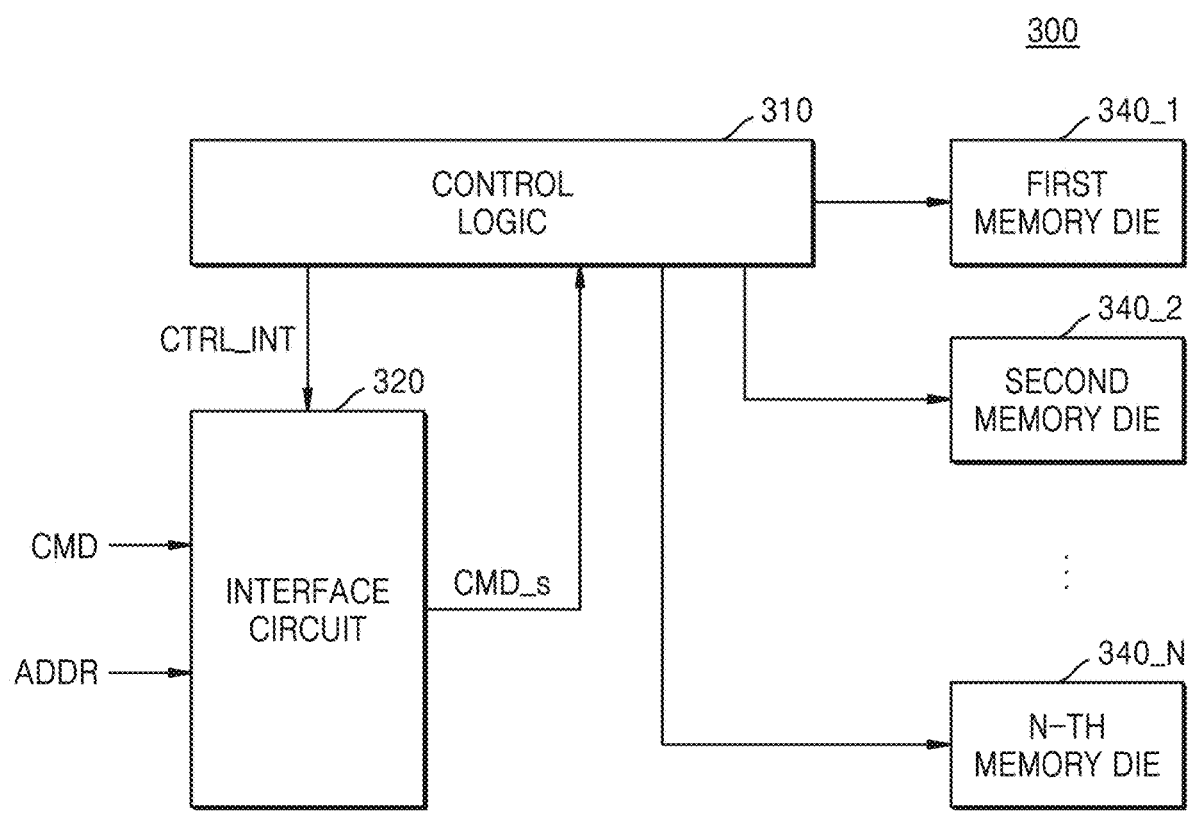
FIG. 3 illustrates a memory device according to an example embodiment.

FIG. 3 illustrates the memory device 300 according to an example embodiment. FIG. 3 illustrates the memory device 300 when the data operation control circuit 330 of the memory device 300 of FIG. 2 is implemented by a combination of hardware and software. The memory device 300 of FIG. 3 will be described, focusing on differences from the memory device 300 of FIG. 2.

The memory device 300 may include the control logic 310, the interface circuit 320, and a plurality of memory dies. The memory dies may include the first memory die 340_1 and the second through N-th memory dies 340_2 through 340_N.

The interface circuit 320 may include a plurality of registers, which correspond to the memory dies, respectively, and each of the registers may store the command CMD for a corresponding memory die. The interface circuit 320 may select one of the registers and output the selected command CMD_s from the selected register. The interface circuit 320 may provide the selected command CMD_s to the control logic 310.

The control logic 310 may control a data operation on at least one memory die based on the command CMD, which is provided from outside the memory device 300 (e.g., the memory controller 200 in FIG. 1), and/or the selected command CMD_s. For example, the control logic 310 may generate data operation control signals for the data operation based on the selected command CMD_s. In other words, as compared to FIG. 2, the control logic 310 of FIG. 3 may further perform the function of the data operation control circuit 330 of FIG. 2.

Figure 4:
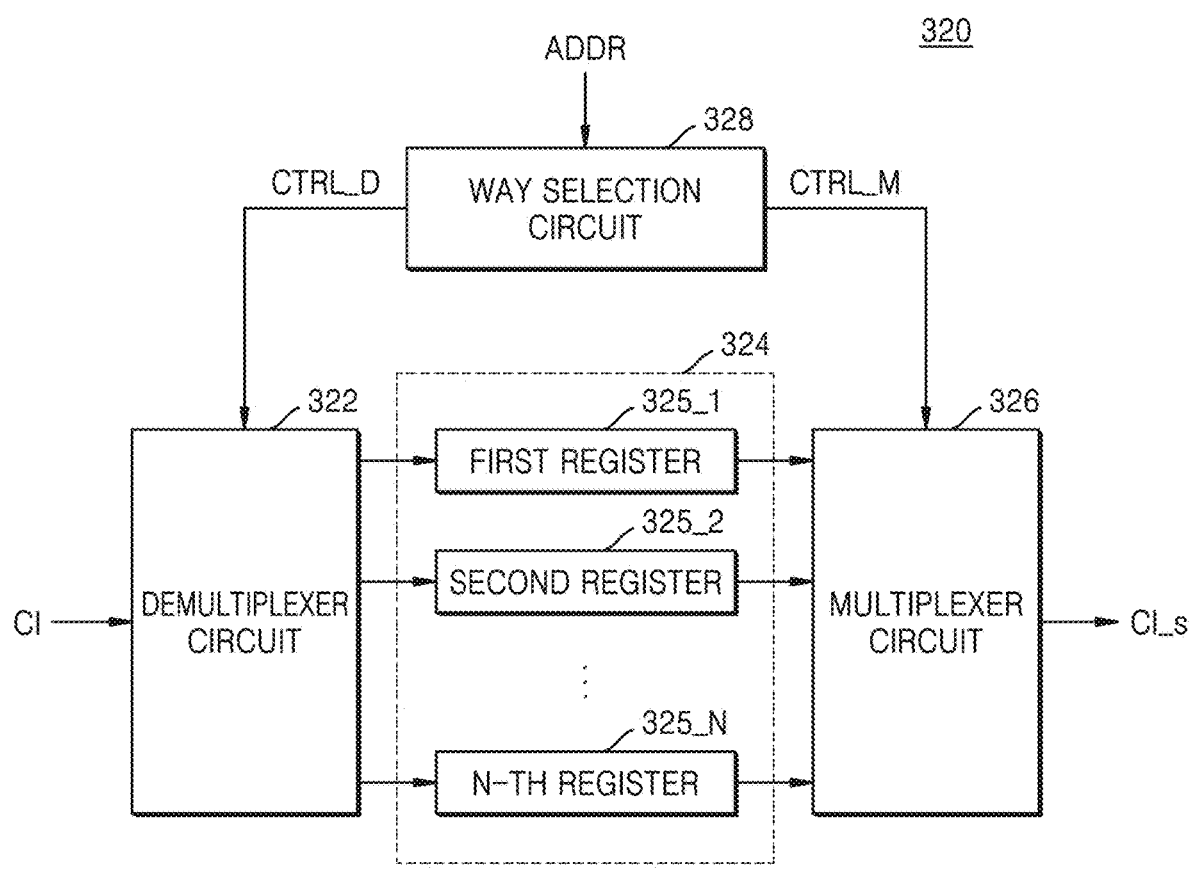
FIG. 4 illustrates an interface circuit according to an example embodiment.

FIG. 4 illustrates the interface circuit 320 according to an example embodiment. The interface circuit 320 of FIG. 4 may correspond to the interface circuit 320 in FIGS. 1 through 3. Redundant descriptions given with reference to FIGS. 1 through 3 will be omitted. FIG. 4 will be described with reference to FIGS. 2 and 3.

The interface circuit 320 may include the demultiplexer circuit 322, a plurality of registers 324, the multiplexer circuit 326, and a way selection circuit 328.

The registers 324 may include a first register 325_1 and second through N-th registers 325_2 through 325_N. The first through N-th registers 325_1 through 325_N may correspond to the first through N-th memory dies 340_1 through 340_N, respectively. For example, the first register 325_1 may store a corresponding one of the plural pieces of command information related to a command for the first memory die 340_1. The corresponding one of the plural pieces of command information may include a command itself and/or data operation control signals generated based on the command. In an example embodiment, the command may include a data operation command related to a data operation.

The demultiplexer circuit 322 may receive and provide command information CI to a register selected from among the registers 324. In other words, the demultiplexer circuit 322 may select one register among the registers 324 and provide the command information CI to the selected register. At this time, when the command information CI is related to the first memory die 340_1, the demultiplexer circuit 322 may provide the command information CI to the first register 325_1 corresponding to the first memory die 340_1. Likewise, when the command information CI is related to the second memory die 340_2, the demultiplexer circuit 322 may provide the command information CI to the second register 325_2 corresponding to the second memory die 340_2. At this time, in an example embodiment, the demultiplexer circuit 322 may select one register among the registers 324 based on a demultiplexer control signal CTRL_D provided from the way selection circuit 328.

The multiplexer circuit 326 may select one register among the registers 324, receive selected command information CI_s from the selected register, and output the selected command information CI_s. Compared to FIGS. 2 and 3, the selected command information CI_s may include the selected command CMD_s in an example embodiment. At this time, in an example embodiment, the multiplexer circuit 326 may select one register among the registers 324 based on a multiplexer control signal CTRL_M provided from the way selection circuit 328. The multiplexer circuit 326 may provide the selected command information CI_s to the control logic 310 or the data operation control circuit 330.

The way selection circuit 328 may designate a register to be selected from the registers 324 for the demultiplexer circuit 322 and the multiplexer circuit 326, based on the address ADDR and/or a chip selection signal. For example, when the first command for the first memory die 340_1 is input to the memory device 300, the way selection circuit 328 may provide the demultiplexer circuit 322 with the demultiplexer control signal CTRL_D for instructing to select the first register 325_1 such that the demultiplexer circuit 322 selects the first register 325_1 from among the registers 324. Likewise, when the memory device 300 resumes a data operation on the first memory die 340_1, the way selection circuit 328 may provide the multiplexer circuit 326 with the multiplexer control signal CTRL_M for instructing to select the first register 325_1 such that the multiplexer circuit 326 selects the first register 325_1 among the registers 324.

Figure 5:
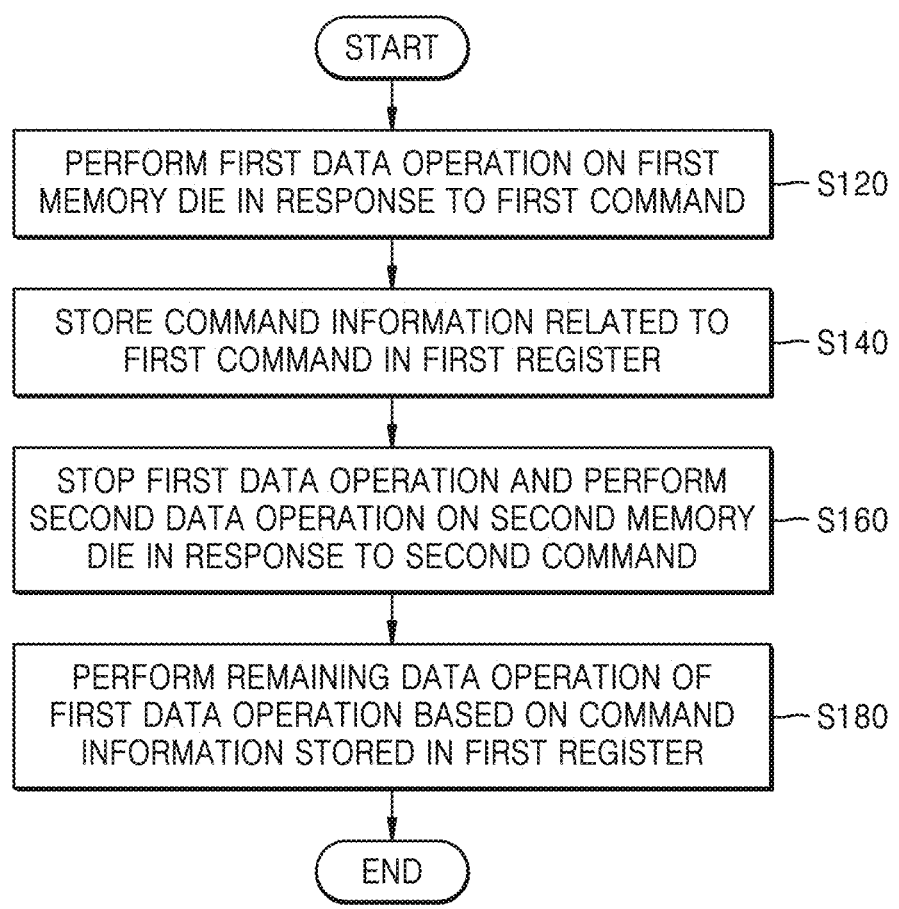
FIG. 5 is a flowchart of a method of operating a memory device, according to an example embodiment.

FIG. 5 is a flowchart of a method of operating a memory device, according to an example embodiment. FIG. 5 will be described with reference to FIGS. 2 through 4.

The memory device 300 may perform a first data operation on the first memory die 340_1 in response to a first command for the first memory die 340_1 in operation S120.

The memory device 300 may store a corresponding one of the plural pieces of command information related to the first command in the first register 325_1 corresponding to the first memory die 340_1 in operation S140. For example, the way selection circuit 328 may provide the demultiplexer control signal CTRL_D to the demultiplexer circuit 322 based on the address ADDR and/or a chip selection signal such that the demultiplexer circuit 322 selects the first register 325_1. The demultiplexer circuit 322 may provide a corresponding one of the plural pieces of command information, which is received in relation with the first command, to the first register 325_1 according to the demultiplexer control signal CTRL_D, which is generated by the way selection circuit 328 based on the address ADDR and/or a chip selection signal. The first register 325_1 may store the corresponding one of the plural pieces of command information. In an example embodiment, the corresponding one of the plural pieces of command information may include the first command itself and/or a data operation control signal generated based on the first command.

The memory device 300 may stop the first data operation on the first memory die 340_1 and perform a second data operation on the second memory die 340_2 in response to a second command in operation S160. In an example embodiment, the memory device 300 may stop the first data operation on the first memory die 340_1 in response to an input of the second command and may perform the second data operation on the second memory die 340_2 based on the second command. In some example embodiments, the first command is a data read command for the first memory die 340_1, and the second command may be a data write command for the second memory die 340_2.

The memory device 300 may perform the remaining data operation of the first data operation on the first memory die 340_1 based on the corresponding one of the plural pieces of command information, which is stored in the first register 325_1 in relation with the first command, in operation S180. In an example embodiment, the memory device 300 may perform at least part of the remaining data operation of the first data operation in response to an input of the address ADDR and/or a chip selection signal, each indicating selection of the first memory die 340_1. In an example embodiment, the way selection circuit 328 may provide the multiplexer control signal CTRL_M to the multiplexer circuit 326 based on the address ADDR and/or the chip selection signal such that the multiplexer circuit 326 selects the first register 325_1. The multiplexer circuit 326 may output the corresponding one of the plural pieces of command information, which is stored in the first register 325_1 in relation with the first command, according to the multiplexer control signal CTRL_M, which is generated by the way selection circuit 328 based on the address ADDR and/or the chip selection signal. For example, the multiplexer circuit 326 may provide plural pieces of command information to the control logic 310 or the data operation control circuit 330. In an example embodiment, when the plural pieces of command information includes the first command, the control logic 310 or the data operation control circuit 330 may generate various data operation control signals based on the first command, thereby controlling the remaining data operation of the first data operation. However, example embodiments are not limited thereto. When the plural pieces of command information includes a data operation control signal generated based on the first command, the control logic 310 or the data operation control circuit 330 may control the remaining data operation of the first data operation based on the data operation control signal. In an example embodiment, the memory device 300 may perform the remaining data operation of the first data operation in response to completion of the second data operation. In an example embodiment, the memory device 300 may perform the remaining data operation of the first data operation based on the first command stored in the interface circuit 320, without receiving an additional command (e.g., a resume command) from outside the memory device 300.

Figure 6:
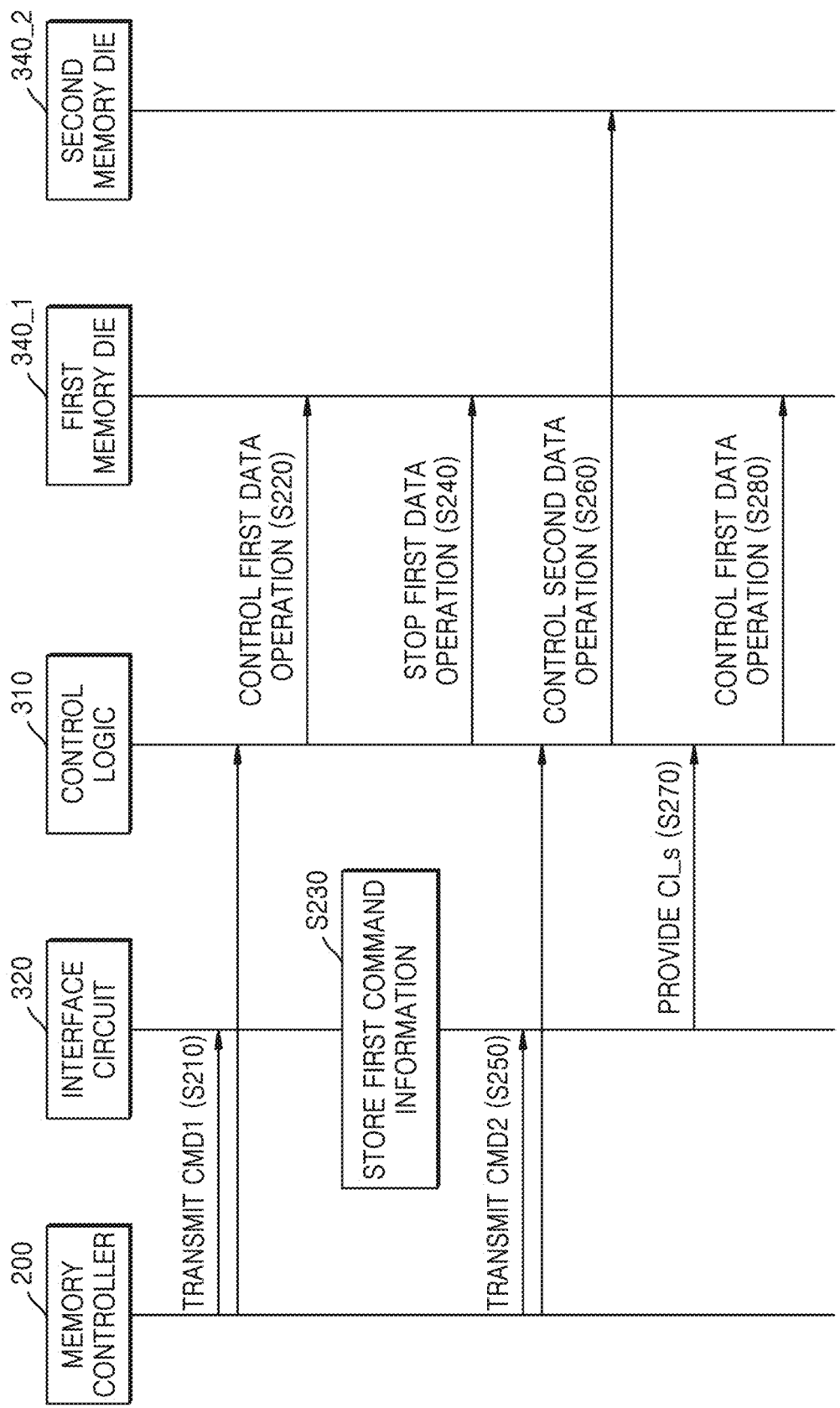
FIG. 6 is a flowchart of a method of operating a memory system, according to an example embodiment.

FIG. 6 is a flowchart of a method of operating a memory system, according to an example embodiment. FIG. 6 will be described with reference to FIGS. 1 through 4. FIG. 6 illustrates an example of a method of operating the memory device 300 when the data operation control circuit 330 is implemented in the control logic 310.

The memory controller 200 may transmit a first command CMD1 for the first memory die 340_1 to the interface circuit 320 and the control logic 310 in operation S210.

The control logic 310 may control a first data operation on the first memory die 340_1 in response to the first command CMD1 in operation S220.

The interface circuit 320 may store first command information related to the first command CMD1 in operation S230. For example, a first register corresponding to the first memory die 340_1 may store the first command information. The first command information may include at least one selected from the first command CMD1 and a data operation control signal generated based on the first command CMD1.

The control logic 310 may stop the first data operation on the first memory die 340_1 in operation S240.

The memory controller 200 may transmit a second command CMD2 for the second memory die 340_2 to the interface circuit 320 and the control logic 310 in operation S250. Although operation S240 is performed before operation S250 in FIG. 6, example embodiments are not limited thereto. According to an example embodiment, operation S240 may be performed in response to operation S250.

The control logic 310 may control a second data operation on the second memory die 340_2 in response to the second command CMD2 in operation S260.

When the address ADDR and/or a chip selection signal, each indicating selection of the first memory die 340_1, is input to the memory device 300, the interface circuit 320 may select the first command information stored in the first register, thereby providing the first command information to the control logic 310 as the selected command information CI_s in operation S270. For example, although not shown in FIG. 6, the memory controller 200 may provide the interface circuit 320 with the address ADDR and/or the chip selection signal, each indicating the selection of the first memory die 340_1, before operation S270.

The control logic 310 may control the remaining data operation of the first data operation on the first memory die 340_1 based on the first command information provided from the interface circuit 320 in operation S280.

Figure 7A:
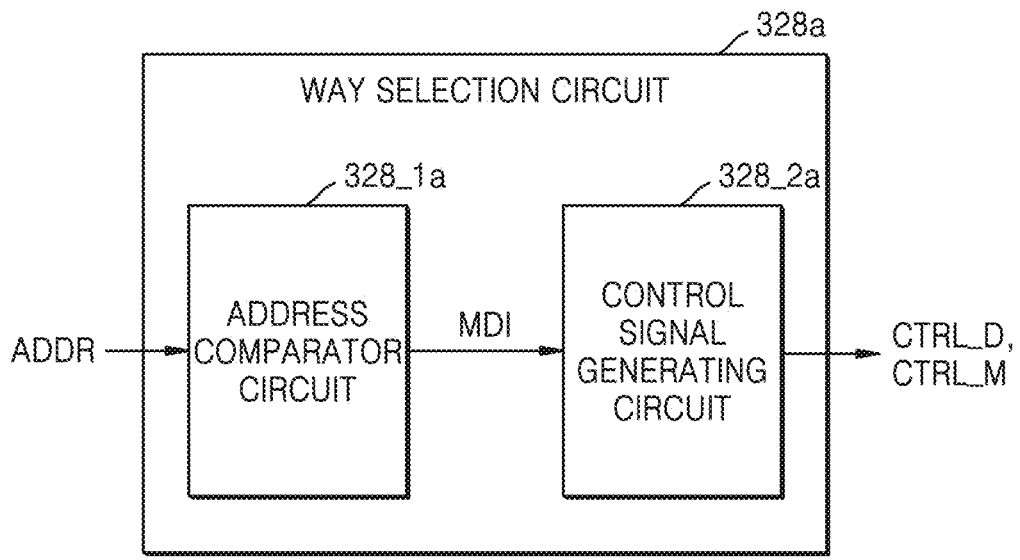
FIGS. 7A and 7B illustrate way selection circuits according to some example embodiments.
Figure 7B:
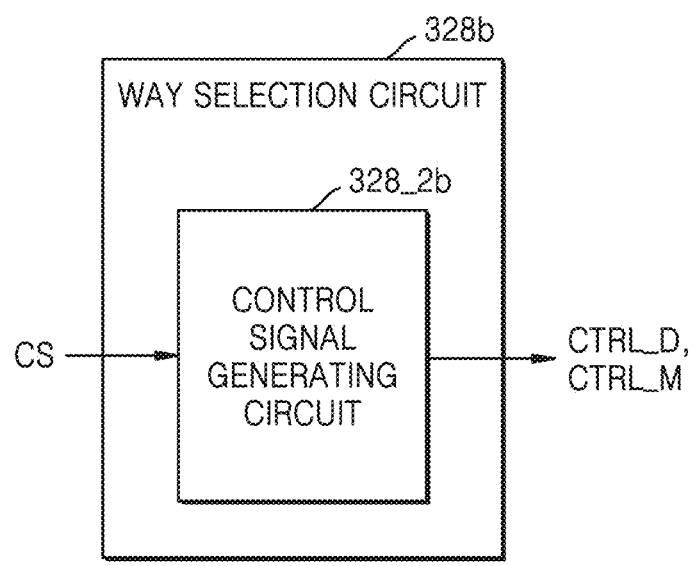

FIGS. 7A and 7B illustrate way selection circuits 328a and 328b according to some example embodiments.

Referring to FIG. 7A, the way selection circuit 328a may include an address comparator circuit 328_1a and a control signal generating circuit 328_2a.

The address comparator circuit 328_1a may detect one memory die in a plurality of memory dies based on the address ADDR. For example, the address comparator circuit 328_1a may store a lookup table including memory die information corresponding to the address ADDR or an address range, compare the address ADDR that is received with the lookup table, and detect a memory die corresponding to the address ADDR. The address comparator circuit 328_1a may provide memory die information MDI to the control signal generating circuit 328_2a based on the detected memory die.

The control signal generating circuit 328_2a may generate control signals based on the memory die information MDI. For example, the control signal generating circuit 328_2a may generate the demultiplexer control signal CTRL_D and the multiplexer control signal CTRL_M based on the memory die information MDI.

The address comparator circuit 328_1a and the control signal generating circuit 328_2a may be implemented in various forms. According to an example embodiment, the address comparator circuit 328_1a and the control signal generating circuit 328_2a may be implemented by hardware or a combination of hardware and software.

Referring to FIG. 7B, the way selection circuit 328b may include a control signal generating circuit 328_2b. The control signal generating circuit 328_2b may generate control signals based on a chip selection signal CS. For example, the chip selection signal CS may refer to a selection signal indicating one of a plurality of memory dies, a selection signal indicating one of a plurality of memory chips, and a selection signal indicating one of a plurality of memory ways. For example, the control signal generating circuit 328_2b may generate the demultiplexer control signal CTRL_D and the multiplexer control signal CTRL_M based on the chip selection signal CS.

Figure 8:
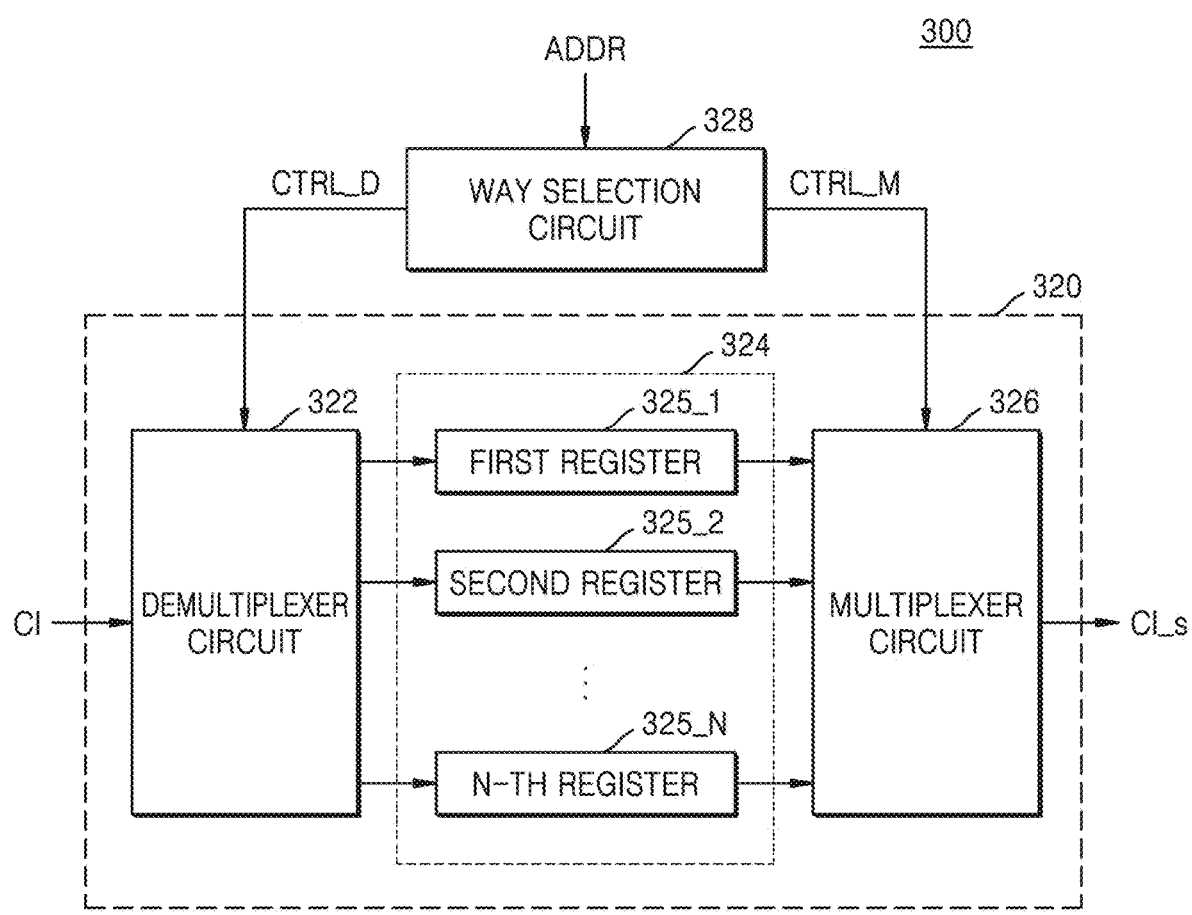
FIG. 8 illustrates a memory device according to an example embodiment.

FIG. 8 illustrates the memory device 300 according to an example embodiment. FIG. 8 particularly illustrates the configuration of the interface circuit 320 of the memory device 300, according to an example embodiment. FIG. 8 will be described, focusing on differences from FIG. 4.

The memory device 300 may include the way selection circuit 328 and the interface circuit 320. The interface circuit 320 may include the registers 324, the demultiplexer circuit 322, and the multiplexer circuit 326. In other words, compared to FIG. 4, the way selection circuit 328 may be implemented outside the interface circuit 320.

The way selection circuit 328 may be implemented in various forms. For example, the way selection circuit 328 may be implemented by hardware or a combination of hardware and software. In an example embodiment, when the way selection circuit 328 is implemented by the combination of hardware and software, the way selection circuit 328 may be implemented as a part of the control logic 310 in FIGS. 2 and 3.

Figure 9:
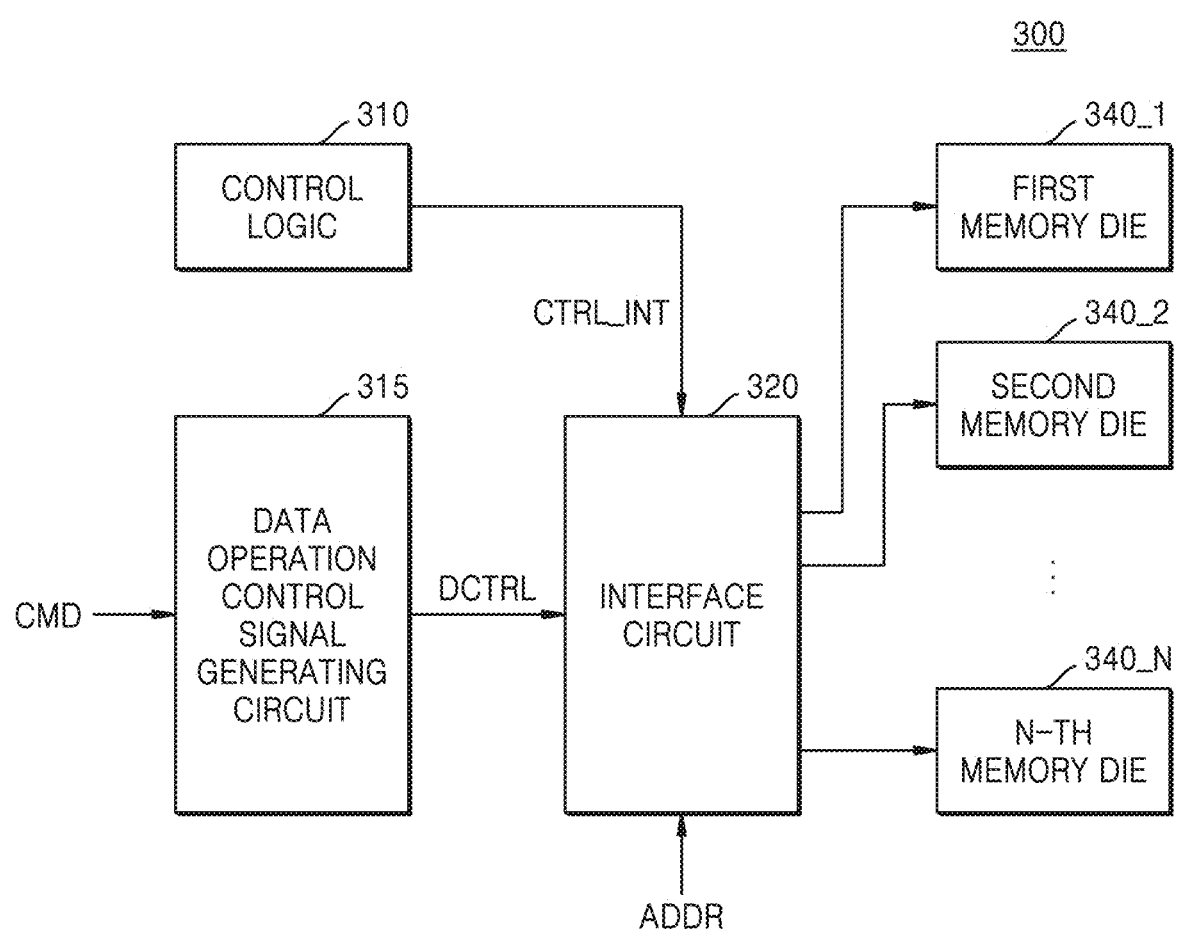
FIG. 9 illustrates a memory device according to an example embodiment.

FIG. 9 illustrates the memory device 300 according to an example embodiment. The memory device 300 of FIG. 9 will be described, focusing on differences from the memory device 300 described above with reference to FIGS. 2 and 3.

The memory device 300 may include the control logic 310, a data operation control signal generating circuit 315, the interface circuit 320, and a plurality of memory dies. The memory dies may include the first memory die 340_1 and the second through N-th memory dies 340_2 through 340_N.

In FIGS. 2 and 3, the interface circuit 320 stores the command CMD itself. In FIG. 9, the interface circuit 320 stores a data operation control signal DCTRL.

The data operation control signal generating circuit 315 may generate the data operation control signal DCTRL based on the command CMD. The data operation control signal DCTRL may include at least one of various control signals for a data operation according to the command CMD in the memory device 300. The data operation control signal generating circuit 315 may provide the data operation control signal DCTRL to the interface circuit 320.

The data operation control signal generating circuit 315 may be implemented in various forms. In an example embodiment, the data operation control signal generating circuit 315 may be implemented by hardware or a combination of hardware and software. When the data operation control signal generating circuit 315 is implemented by hardware, the data operation control signal generating circuit 315 may include circuits for generating the data operation control signal DCTRL based on the command CMD. When the data operation control signal generating circuit 315 is implemented by the combination of hardware and software, the data operation control signal DCTRL may be generated by executing a program and/or instructions, each loaded to a memory in the memory device 300, using the control logic 310 or a processor in the memory device 300. For example, the data operation control signal generating circuit 315 may be firmware. However, example embodiments are not limited thereto.

The interface circuit 320 may store the data operation control signal DCTRL in a register corresponding to a memory die selected from the memory dies according to the address ADDR and/or a chip selection signal. Further, the interface circuit 320 may provide the data operation control signal DCTRL that has been stored to the memory dies or elements for a data operation in the memory device 300 during memory interleaving, thereby controlling the data operation on at least one of the memory dies.

Figure 10:
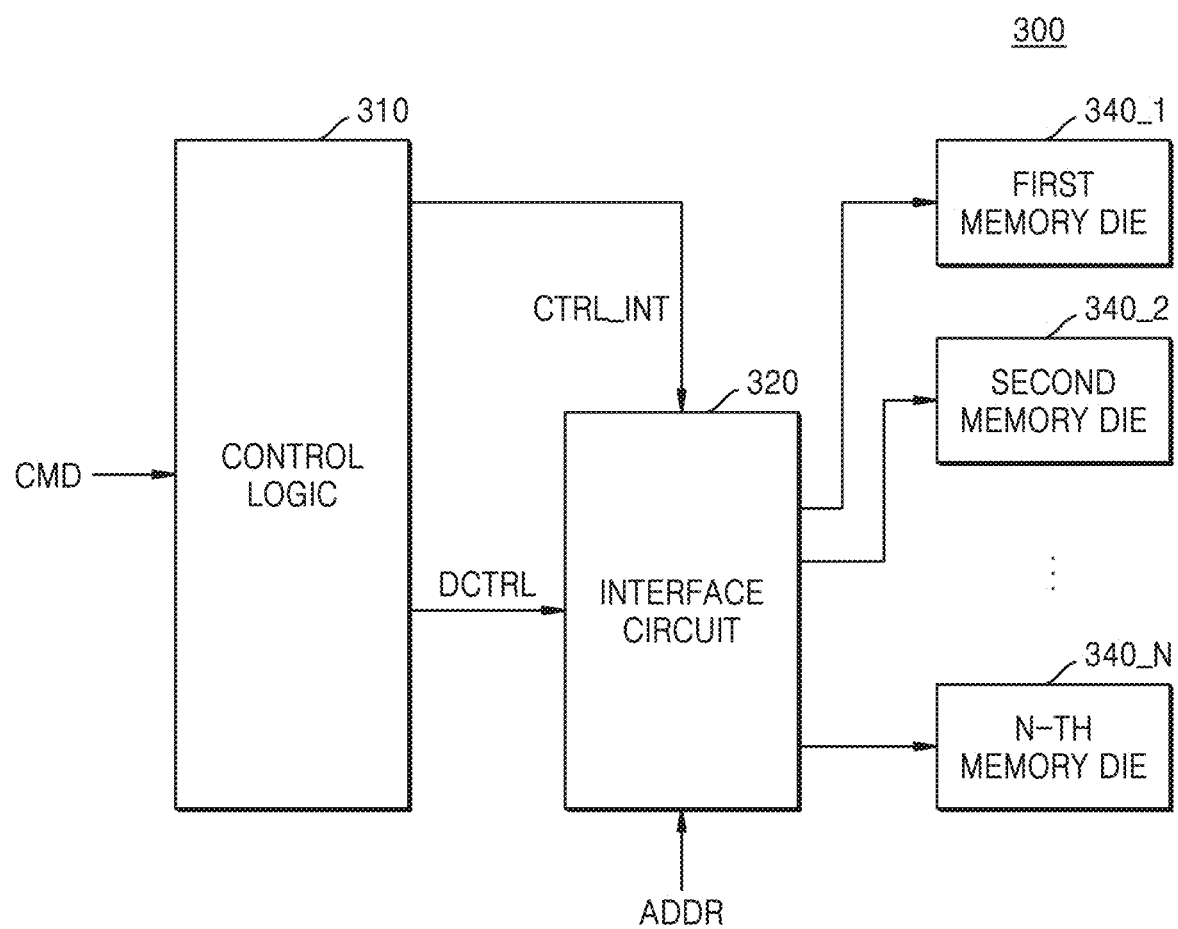
FIG. 10 illustrates a memory device according to an example embodiment.

FIG. 10 illustrates the memory device 300 according to an example embodiment. FIG. 10 particularly illustrates the memory device 300 in which the control logic 310 includes the function of the data operation control signal generating circuit 315 of the memory device 300 of FIG. 9. The memory device 300 of FIG. 10 will be described, focusing on differences from the memory device 300 of FIG. 9.

The memory device 300 may include the control logic 310, the interface circuit 320, and a plurality of memory dies. The memory dies may include the first memory die 340_1 and the second through N-th memory dies 340_2 through 340_N.

The control logic 310 may generate the data operation control signal DCTRL based on the command CMD input thereto and provide the data operation control signal DCTRL to the interface circuit 320. In other words, compared to FIG. 9, the control logic 310 may further perform the function of the data operation control signal generating circuit 315 in FIG. 9.

Figure 11:
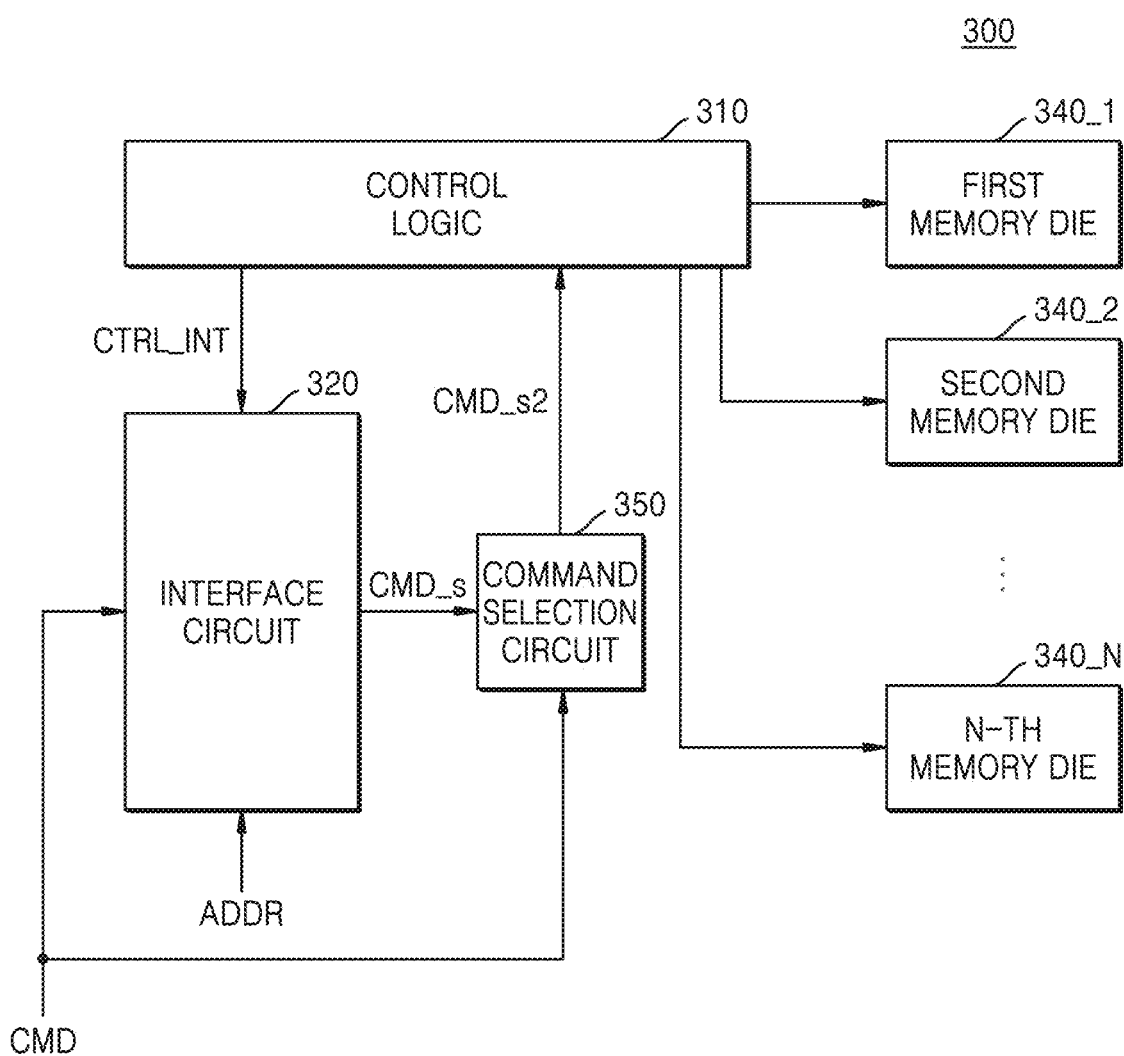
FIG. 11 illustrates a memory device according to an example embodiment.

FIG. 11 illustrates the memory device 300 according to an example embodiment. The memory device 300 may include the control logic 310, the interface circuit 320, a command selection circuit 350, and a plurality of memory dies. The memory dies may include the first memory die 340_1 and the second through N-th memory dies 340_2 through 340_N. The memory device 300 of FIG. 11 will be described, focusing on differences from the memory device 300 of FIG. 3.

The interface circuit 320 may store the command CMD input thereto in a selected register from among a plurality of registers therein and may output the selected command CMD_s from the selected register when requested. The interface circuit 320 may provide the selected command CMD_s to the command selection circuit 350.

The command selection circuit 350 may select one from among the selected command CMD_s and the command CMD, and provide a second selected command CMD_s2 to the control logic 310. For this operation, the command selection circuit 350 may include a multiplexer. Unlike when the command selection circuit 350 is omitted, when there is the command selection circuit 350, the data operation of the memory device 300 may be controlled based on a requested command among the command CMD externally input to the memory device 300 (e.g., input to the memory device 300 from outside the memory device 300) and the selected command CMD_s that has been stored in and transmitted from the interface circuit 320.

Figure 12:
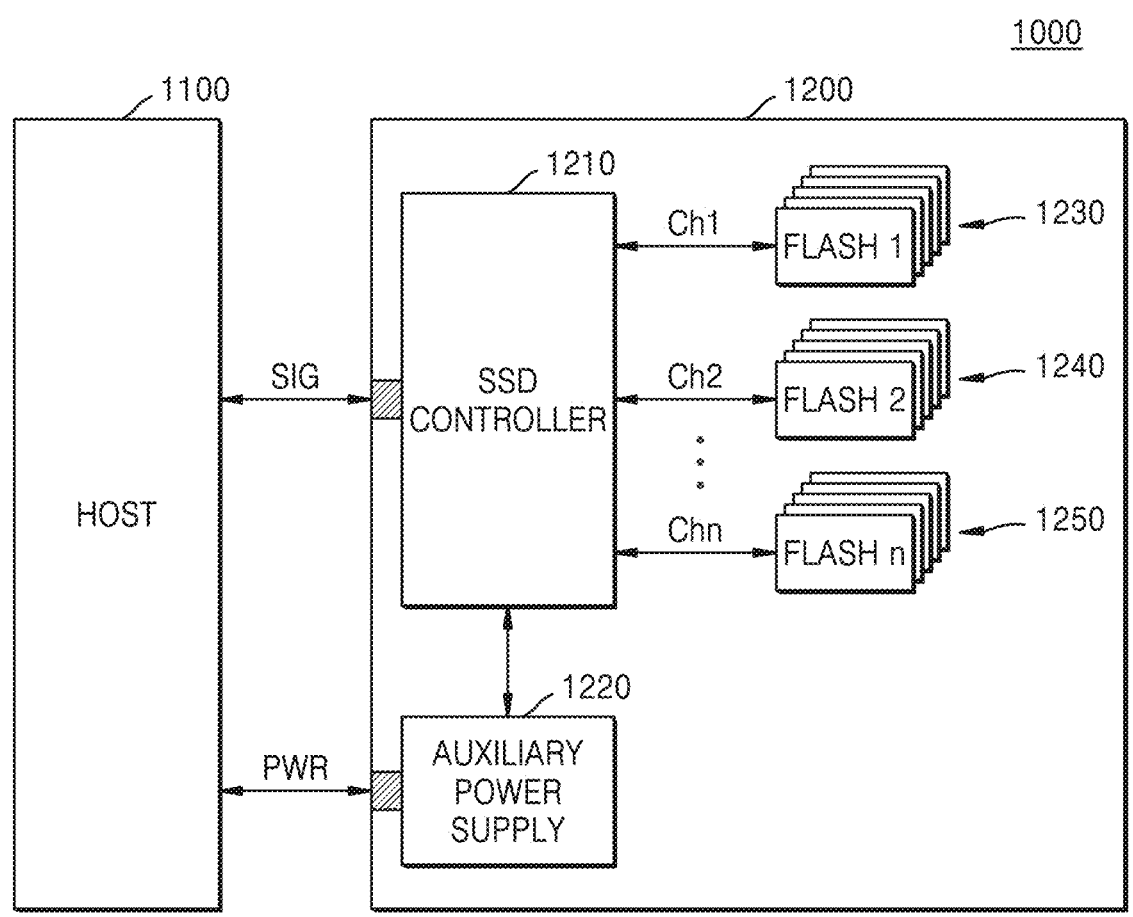
FIG. 12 illustrates a solid state disk or drive (SSD) system according to an example embodiment.

FIG. 12 illustrates an SSD system 1000 according to an example embodiment. The SSD system 1000 may include a host 1100 and an SSD 1200. The SSD 1200 may exchange signals with the host 1100 through a signal connector SIG, and may receive electric power through a power connector PWR. The SSD 1200 may include an SSD controller 1210, an auxiliary power supply 1220, and flash memory devices 1230, 1240, and 1250. At this time, the SSD 1200 may be implemented using the example embodiments illustrated in FIGS. 1 through 11.

According to the example embodiments illustrated in FIGS. 1 through 11, each of the flash memory devices 1230, 1240, and 1250 may include a voltage regulator (not shown). Accordingly, each of the flash memory devices 1230, 1240, and 1250 may include an interface circuit and a plurality of memory dies. The interface circuit may include a plurality of registers, each of which may store a corresponding one of the plural pieces of command information for a memory die corresponding thereto. Each of the flash memory devices 1230, 1240, and 1250 may finish a data operation, which has been stopped, based on the corresponding one of the plural pieces of command information stored in the interface circuit during memory interleaving or the like. Accordingly, the SSD controller 1210 does not need to provide the flash memory devices 1230, 1240, and 1250 with an additional command such as a resume command. Therefore, the data communication time of the flash memory devices 1230, 1240, and 1250 and the SSD 1200 may be reduced, and furthermore, the operating speed thereof may be increased.

While the inventive concepts have been particularly shown and described with reference to some example embodiments described above, it will be understood that various changes in form and details may be made therein without departing from the spirit and scope of the following claims.

What is claimed is:

1. An interface circuit of a memory device including a plurality of memory dies, comprising:
   a plurality of registers corresponding to the plurality of memory dies, respectively, the plurality of registers each configured to store command information related to a data operation command;
   a demultiplexer circuit configured to provide input command information to a selected register from among the plurality of registers according to at least one of a first address or a first chip selection signal, the input command information being received from outside the interface circuit; and
   a multiplexer circuit configured to receive output command information from the selected register from among the plurality of registers and output the output command information according to at least one of a second address or a second chip selection signal, wherein the plurality of memory dies include a first memory die and a second memory die, the plurality of registers include a first register configured to store first command information corresponding to the first memory die and a second register configured to store second command information corresponding to the second memory die, the command information including the first command information and the second command information, the demultiplexer circuit is configured to provide the first register with first command information in response to an input of a first data operation command for the first memory die, the first command information being related to the first data operation command, and the interface circuit is configured to cause a first data operation on the first memory die to stop and resume according to the first data operation command in response to a second data operation on the second memory die.

2. The interface circuit of claim 1, further comprising:
a way selection circuit configured to generate a demultiplexer control signal for controlling a first register selection of the demultiplexer circuit and a multiplexer control signal for controlling a second register selection of the multiplexer circuit, based on the at least one of the first address or the first chip selection signal.

3. The interface circuit of claim 2, wherein the way selection circuit is further configured to,
compare the first address with a lookup table stored therein,
select a memory die among the plurality of memory dies based on a result of the comparison, and
generate the demultiplexer control signal and the multiplexer control signal such that the demultiplexer circuit and the multiplexer circuit select a register corresponding to the selected memory die from among the plurality of registers.

4. The interface circuit of claim 2, wherein the way selection circuit is further configured to,
select a memory die corresponding to the first chip selection signal from among the plurality of memory dies, and
generate the demultiplexer control signal and the multiplexer control signal such that the demultiplexer circuit and the multiplexer circuit select one register, from among the plurality of registers, corresponding to the selected memory die.

5. The interface circuit of claim 1, wherein
the multiplexer circuit is further configured to select and output the first command information in response to an input of at least one of an address or a chip selection signal, each indicating selection of the first memory die, the first command information being stored in the first register.

6. The interface circuit of claim 1, wherein the first command information includes at least one of the first data operation command or data operation control signals generated based on the first data operation command.

7. A method of operating a memory device including a first memory die and a second memory die, the method comprising:
performing a first data operation on the first memory die in response to a first input of a first command;
storing first command information related to the first command in a first register corresponding to the first memory die;
stopping the first data operation in response to a second command for the second memory die;
performing a second data operation on the second memory die in response to a second input of the second command; and
performing a remaining data operation on the first memory die based on the first command information stored in the first register, in response to completion of the second data operation on the second memory die without receiving an additional resume command, the remaining data operation having not been performed during the first data operation.

8. The method of claim 7, wherein the memory device includes an interface circuit including a plurality of registers, the plurality of registers each storing command information corresponding to a corresponding one of a plurality of memory dies, the plurality of memory dies including the first memory die and the second memory die.

9. The method of claim 8, wherein the storing first command information includes storing the first command information in the first register corresponding to the first memory die from among the plurality of registers.

10. The method of claim 7, wherein the performing a remaining data operation includes performing the remaining data operation of the first data operation in response to a third input of at least one of an address or a chip selection signal, each indicating selection of the first memory die.

11. The method of claim 7, wherein the first command information includes at least one of the first command or a first data operation control signal generated based on the first command.

12. The method of claim 11, wherein
the storing first command information includes storing the first command, and
the performing a remaining data operation includes,
generating second data operation control signals based on the first command that has been stored, the second data operation control signals being related to the first command, and
performing the remaining data operation of the first data operation using the second data operation control signals.

13. The method of claim 11, wherein
the storing of the first command information includes,
generating the first data operation control signal based on the first command, and
storing the first data operation control signal, and
the performing a remaining data operation includes performing the remaining data operation of the first data operation using the first data operation control signal that has been stored.

14. A memory device comprising:
a plurality of memory dies including a first memory die and a second memory die;
an interface circuit configured to store plural pieces of command information, the plural pieces of command information corresponding to the plurality of memory dies, respectively, the interface circuit configured to selectively output at least one of the plural pieces of command information; and
a control logic configured to,
perform a first data operation according to a first selection signal and a first command, stop the first data operation on the first memory die in response to an input of a second selection signal and a second command for the second memory die during performing the first data operation, control the memory device to perform a second data operation corresponding to the second command on the second memory die, and control the memory device to perform a remaining data operation of the first data operation on the first memory die based on first piece of the plural pieces of command information in response to a re-input of the first selection signal in response to completion of the second data operation on the second memory die, the first piece of the plural pieces of command information related to the first command received from the interface circuit.

15. The memory device of claim 14, wherein the interface circuit includes:

a plurality of registers storing the plural pieces of command information, respectively, the plural pieces of command information corresponding to the plurality of memory dies, respectively;

a demultiplexer circuit configured to provide input command information to a selected register from among the plurality of registers according to at least one of a first address or a first chip selection signal, the input command information received from outside the memory device; and a multiplexer circuit configured to receive output command information from the selected register from among the plurality of registers and output the output command information according to at least one of a second address or a second chip selection signal.

16. The memory device of claim 15, wherein the interface circuit further includes a way selection circuit, the way selection circuit configured to, generate a demultiplexer control signal for controlling a first register selection of the demultiplexer circuit based on the at least one of the first address or the first chip selection signal, and generate a multiplexer control signal for controlling a second register selection of the multiplexer circuit based on the at least one of the second address or the second chip selection signal.

17. The memory device of claim 14, wherein the interface circuit is configured to store a plurality of data operation commands, the plurality of data operation commands corresponding to the plurality of memory dies, respectively, and the control logic is configured to, generate data operation control signals based on the first command, and control the memory device to perform the remaining data operation of the first data operation based on the data operation control signals.

18. The memory device of claim 17, wherein the control logic is further configured to, select one command of the first command or a third command, the third command input from outside the memory device, and generate the data operation control signals based on the selected one command.

19. The memory device of claim 14, wherein the interface circuit stores data operation control signals generated based on a data operation command corresponding to each of the plurality of memory dies, and the control logic is configured to control the memory device to perform the remaining data operation of the first data operation on the first memory die based on first data operation control signals corresponding to the first command in response to completion of the second data operation.

* * * * *